Aug. 18, 1959  G. E. BERENS  2,899,808
SHAFT COUPLER
Filed Nov. 13, 1956
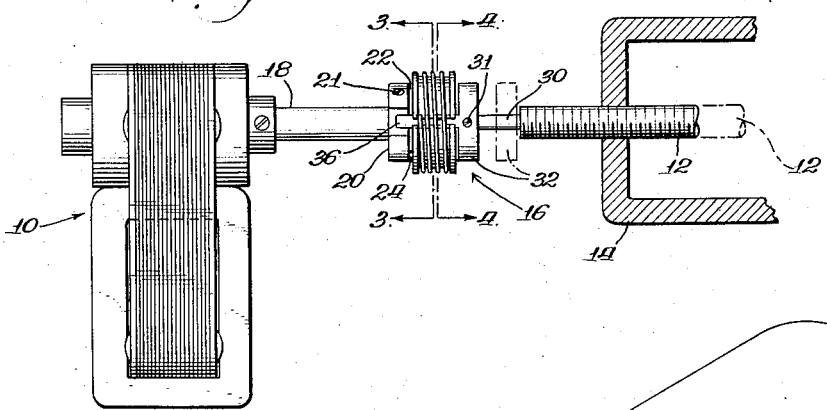
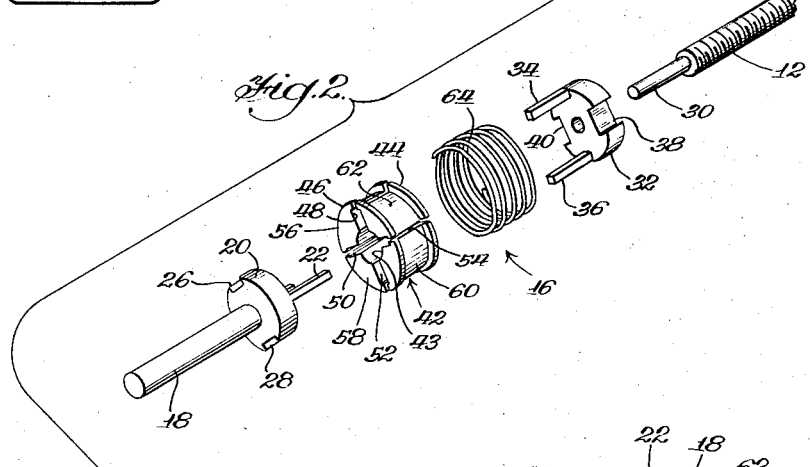
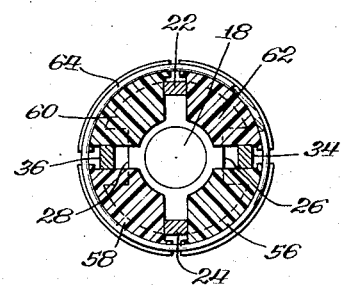
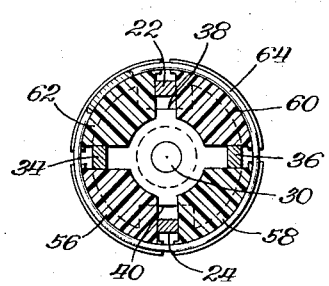
INVENTOR.
Gregory E. Berens
BY
Mueller and Aichele
Attys.

United States Patent Office 2,899,808
Patented Aug. 18, 1959

2,899,808

SHAFT COUPLER

Gregory E. Berens, Phoenix, Ariz., assignor to Motorola, Inc., Chicago, Ill., a corporation of Illinois Application November 13, 1956, Serial No. 621,959

7 Claims. (Cl. 64—14)

This invention relates to new and useful improvements in shaft or torque couplers and more particularly to a shaft coupler which is extensible, which is free from backlash, and which provides a universal type connection.

In certain types of electrical equipment, there is a need for a shaft coupler for an electric motor which is capable of driving a threaded member and which is extensible with movement of the driven member. Such a coupler should be free from backlash and should provide an electrical insulation between the driving motor or other driving mechanism and the driven member. This coupler should also provide at least a limited universal movement to avoid the necessity of accurate alignment of the driving and driven shafts.

It is therefore one object of this invention to provide a new and improved shaft coupler which is extensible during operation.

Another object of this invention is to provide an improved shaft coupler which is completely free from backlash.

A further object of this invention is to produce a shaft coupler which provides a universal connection.

A feature of this invention is the provision of a shaft coupler having coupling members mounted on rotatable shafts which include spaced torque transmitting surfaces which are separated and held accurately in position by spacer members which transmit torque therebetween.

Another feature of this invention is the provision of an improved shaft coupler having a pair of pronged coupling members supported upon rotatable shafts and having spacer members each shaped as the quadrant of a cylinder and held together by a coil spring surrounding the spacer members and pronged coupling members.

Other objects and features of this invention will become apparent from time to time through the specification and claims as hereinafter related.

In the accompanying drawings, to be taken as a part of this specification, there is clearly and fully illustrated a preferred embodiment of this invention, in which drawings:

Fig. 1 is a view in front elevation showing a motor driving the shaft coupler which constitutes this invention and showing in section a threaded member driven by the coupler, Fig. 2 is an exploded view, in perspective, of the shaft coupler shown in Fig. 1, Fig. 3 is a sectional view of the shaft coupler taken along the line 3—3 of Fig. 1, and Fig. 4 is a sectional view of the shaft coupler taken along the line 4—4 of Fig. 1.

This invention consists of a new and improved shaft coupler for driving an extensible shaft, such as a threaded shaft, which moves away from the driving means during operation. This shaft coupler consists of a pair of coupling members each mounted on rotatable shafts and having at least two bearing surfaces such as outwardly extending prongs which are spaced from each other and secured in position by spacer members. The spacer members are preferably of an insulating material such as a moulded plastic and are in the form of quarter sectors of a cylindrical spool-shaped member. The coupling members and spacer members are held together by a helical spring surrounding the spool-shaped spacer members. The spring holds the spacer members firmly against the bearing surface, permitting sliding movement therebetween to provide universal movement and extensibility, but preventing backlash.

Referring to the drawings by numerals of reference, and more particularly to Fig. 1, there is shown an electric motor 10 which is arranged to drive a threaded shaft 12 carried in a wall member 14. The shaft 12 is driven through an extensible and universal coupler 16 which is shown in more detail in Figs. 2 to 4.

The shaft coupler 16 includes a shaft 18 which may be the motor shaft or which may be connected to the motor shaft by any suitable connection. The shaft 18 has a coupling member 20 secured thereon as by a set screw 21. The coupling member 20 has a cylindrical base portion and prongs 22 and 24 which extend outwardly therefrom and parallel to the axis of the shaft 18. The prongs 22 and 24 are preferably located diametrically opposite one another and extend from the periphery of the base portion but could have other locations if suitably designed spacer members were used. The coupling member 20 also has notched portions 26 and 28 in the periphery of the base portion which are preferably positioned diametrically opposite each other approximately midway between the prongs 22 and 24.

The threaded shaft 12 has a shaft portion 30 on which there is secured a second coupling member 32 by a set screw 31. The coupling member 32 has a cylindrical base portion and prongs 34 and 36 extending outwardly from the periphery thereof and parallel to the axis of the shaft portion 30. The coupling member 32 is also provided with peripheral notches 38 and 40 which are diametrically opposite one another at a point approximately midway between the prongs 34 and 36. The coupling members 32 and 20 are preferably of the same size and shape and have their respective peripheral notches positioned to receive the prongs of the other coupling member.

This coupler is also provided with a plurality of spacer members 56, 58, 60 and 62 which may be cut from a spool-shaped insulating member 42 or could be separately formed. The spacer members are preferably of an insulating material such as molded nylon which is quite rigid. The spacer members when assembled have a spool shape with rims 44 and 46 extending around each end portion and a central aperture 43 therein. The assembled spacer members are separated as at 48, 50, 52, and 54.

When this coupler is assembled the coupling members 20 and 32 are positioned with prongs 22 and 24 fitting grooves 38 and 40, and prongs 34 and 36 fitting grooves 26 and 28. The spacer members cut from the insulator spool 42 are placed between the prongs to secure the same in position. The spacer members are positioned with spacer member 60 between prongs 22 and 36, spacer member 58 between prongs 36 and 24, spacer member 56 between prongs 24 and 34, and spacer member 62 between prongs 34 and 22. The assembled coupler is held together by a spring 64 which surrounds the spacer members and is prevented from slipping off by the rims 44 and 46.

*Operation*

In operation, the rotation of the shaft 18 by the motor 10 causes the coupling member 20 and prongs 22 and 24 thereon to rotate. The rotation of the coupling member 20 and prongs 22 and 24 is transmitted through the spacer members 56, 58, 60, and 62, to the prongs 34 and 36 on the coupling member 32 and to the shaft portion 30 of the threaded shaft 12. As the shaft 12 is rotated it moves outward toward the position indicated by the dotted lines in Fig. 1. During this movement the coupling member 32 moves away from the coupling member 20 but retains an operative connection through the spacer members 56, 58, 60, and 62. This shaft coupler therefore provides extensible movement of the shaft 12 through a distance determined by the length of the prongs 22, 24, 34, and 36. The extensibility of this coupling also functions to prevent the transmission of axial movement between the driving and driven shafts.

The helical spring 64 continually compresses the spacer members 56, 58, 60, and 62, into the spaces between the prongs 24, 34, 22, and 36, and thus maintains a tight connection at all times free from backlash. As the spacer members become worn the spring 64, which provides resilient or elastic peripheral engagement therewith, presses them against the prongs to compensate for wear and maintains a tight connection free from backlash.

The coupling member 20 is free to move through a small angular movement in the plane of the prongs 22 and 24. The shaft 18 may have a small amount of lateral play determined by the size of the spacer members and the slot in which the prongs 22 and 24 are positioned. The coupling member 32 is also capable of having a small angular movement in the plane of the prongs 34 and 36 and may permit lateral movement of the shaft 30 depending upon the size of the spacer members and the slots in which the prongs 34 and 36 are positioned. This small amount of angular and lateral play permitted the shafts 18 and 12 is effective to provide a limited universal connection between the shafts. The shafts may be out of alignment or at a slight angle to one another and still be provided with a suitable connection through the functioning of this coupler as a universal connection.

This shaft coupler has been described with particular emphasis on a construction utilizing two coupling members each of which has a pair of prongs which transmit thrust through spacer members held in place by a coil spring. It will be apparent, however, to anyone skilled in the art, that in making a coupler of this general type which is free from backlash and extensible the coupling members are not necessarily limited to two prongs on each member. It is also apparent that the prongs could be round instead of rectangular in cross-section or could extend radially inward for a greater distance than is shown herein. In fact, the prongs on one of the coupling members could be replaced with a plate extending diametrically thereacross in the same plane now occupied by the prongs. Such a construction would function satisfactorily as long as spacer members are used which insure a firm connection and which are sufficiently oversized as to be continually compressed against the torque transmitting surface of the prongs or other torque transmitting members to maintain a connection free from backlash.

I claim:

1. An anti-backlash extensible universal bidirectional coupler including in combination, first and second rotatable coupling members each having at least two torque transmitting surfaces positioned outward from the axis of rotation and rotatable thereabout, the planes of said surfaces of said first member intersecting the planes of said surfaces of said second member at substantially a right angle, a plurality of spacer members made of rigid material in the form of sectors of a cylinder and positioned between said torque transmitting surfaces to transmit torque from one shaft to the other, said torque transmitting surfaces being extensibly and angularly movable in the plane of engagement with said spacer members, and elastic peripheral means surrounding said spacer members and holding the same in operative engagement with said torque transmitting surfaces.

2. An anti-backlash extensible universal bidirectional coupler including in combination, first and second rotatable shafts, a rotatable member secured on each shaft having at least two spaced prongs extending substantially parallel to the axis of rotation of the shaft and rotatable thereabout, said shafts and rotatable members being positioned with said prongs in an overlapping relation longitudinally and substantially equally spaced angularly about the axis of the shafts, a plurality of spacer members positioned between said prongs to transmit torque from one shaft to the other, said prongs being operable to have extensible movement in the direction of the axis of rotation and angular movement in the plane of engagement with said spacer members, and spring means surrounding said spacer members and said prongs and holding the same in operative engagement.

3. An anti-backlash extensible universal bidirectional coupler including in combination, first and second rotatable shafts, a rotatable member secured on each shaft having at least two spaced prongs extending substantially parallel to the axis of rotation of the shaft and rotatable thereabout, said shafts and rotatable members being positioned with said prongs in an overlapping relation longitudinally and substantially equally spaced angularly about the axis of the shafts, a plurality of insulating spacer members having substantially the form of sectors of a cylinder positioned between said prongs to transmit torque from one shaft to the other, said prongs being operable to have extensible movement in the direction of the axis of rotation and angular movement in the plane of engagement with said spacer members, and spring means surrounding said spacer members and said prongs and holding the same in operative engagement.

4. An anti-backlash extensible universal bidirectional coupler including in combination, first and second rotatable members, having at least two spaced prongs extending substantially parallel to the axis of rotation thereof and rotatable thereabout, said rotatable members being positioned with said prongs in an overlapping relation longitudinally and substantially equally spaced angularly about the axis of rotation thereof, a plurality of spacer members having substantially the form of sectors of a cylinder and having peripheral rims at each end positioned between said prongs to transmit torque from one rotatable member to the other, said prongs being extensibly movable in the direction of the axis of rotation and angularly movable in the plane of engagement with said spacer members, and spring means retained in place by said rims and surrounding said spacer members and said prongs and holding the same in operative engagement.

5. An anti-backlash extensible universal coupler including in combination, first and second rotatable members adapted to be secured on rotatable shafts, each of said rotatable members having a cylindrical base portion and a pair of parallel prongs extending from the periphery thereof and lying in a common plane with the axis of said cylindrical base portion, the base portions of said rotatable members each having a pair of diametrically opposed notches in the peripheral edges thereof in a position substantially midway between said prongs and of a size operable to receive the prongs of the other rotatable member, said rotatable members having an initial position with the prongs of each positioned in the notches of the other, spacer members having substantially the form of quadrants of a cylinder and having peripheral rims at each end, said spacer members being positioned between said prongs to transmit torque therebetween, a helical spring surrounding said spacer members to hold the same tightly against said prongs and retained in place by said rims, and said rotatable members being movable longitudinally and angularly within said spacer members to provide an extensible and universal connection free from backlash.

6. An anti-backlash, extensible, universal, bidirectional coupler including in combination, first and second rotatable shafts, a rotatable member secured on each shaft and having at least two spaced prongs extending substantially parallel to the axis of rotation of the shaft and rotatable thereabout, said shafts and rotatable members being positioned with said prongs in an overlapping relation longitudinally and substantially equally spaced angularly about the axis of the shafts, a plurality of spacer members positioned between said prongs to transmit torque from one shaft to another, said prongs being extensibly movable in the direction of the axis of rotation and angularly movable in the plane of engagement with said spacer members, and resilient means surrounding said spacer members and said prongs along substantially the entire length of said spacer members in the direction of said axis of rotation and exerting a constrictive force holding said spacer members and said prongs in operative engagement.

7. An anti-backlash, extensible, universal, bidirectional coupler including in combination, first and second rotatable members adapted to be secured to rotatable shafts, each of said rotatable members having a cylindrical base portion and a prong extending from the periphery thereof and lying in a common plane with the axis of said cylindrical base portion, the base portions of said rotatable members each having a notch in the peripheral edges thereof and of a size operable to receive the prong of the other rotatable member, spacer members positioned between said prongs to transmit torque therebetween, and resilient means surrounding said spacer members to hold the same tightly against said prongs.

References Cited in the file of this patent

UNITED STATES PATENTS

| | | |
|---|---|---|
| 1,043,493 | Whitworth | Nov. 5, 1912 |
| 1,316,011 | Bailey et al. | Sept. 16, 1919 |
| 1,459,035 | Raisig | June 19, 1923 |
| 2,092,704 | Ricefield | Sept. 7, 1937 |
| 2,146,765 | Ricefield | Feb. 14, 1939 |
| 2,335,170 | Cerisano | Nov. 23, 1943 |
| 2,620,640 | Bales | Dec. 9, 1952 |
| 2,692,486 | Anderson | Oct. 26, 1954 |
| 2,699,656 | Anderson et al. | Jan. 18, 1955 |

FOREIGN PATENTS

| | | |
|---|---|---|
| 224,150 | Great Britain | Nov. 26, 1924 |